US006080994A

United States Patent [19]

Carrott et al.

[11] Patent Number: 6,080,994

[45] Date of Patent: Jun. 27, 2000

[54] HIGH OUTPUT REFLECTIVE OPTICAL CORRELATOR HAVING A FOLDED OPTICAL AXIS USING FERRO-ELECTRIC LIQUID CRYSTAL SPATIAL LIGHT MODULATORS

[75] Inventors: David T. Carrott, Palmdale; Barry Dydyk, Newbury Park, both of Calif.; James P. Karins, Honolulu, Hi.; John Lucas, Morristown, N.J.; Bob Mitchell, Woodland Hills; Stuart Mills, West Hills, both of Calif.

[73] Assignee: Litton Systems, Inc., Woodland Hills, Calif.

[21] Appl. No.: 09/126,450

[22] Filed: Jul. 30, 1998

[51] Int. Cl.[7] .......... G02B 27/42

[52] U.S. Cl. .......... 250/550; 250/559.44; 359/561

[58] Field of Search .......... 250/550, 559.44; 359/561, 559–560; 382/130, 103, 278, 280; 356/345

[56] References Cited

U.S. PATENT DOCUMENTS

| | | | |
|---|---|---|---|
| 4,357,676 | 11/1982 | Brown | 356/345 |
| 4,573,198 | 2/1986 | Anderson | 382/31 |
| 5,148,496 | 9/1992 | Anderson | 382/42 |
| 5,311,359 | 5/1994 | Lucas et al. | 359/561 |
| 5,386,313 | 1/1995 | Szegedi et al. | 359/280 |
| 5,418,380 | 5/1995 | Simon et al. | 250/550 |
| 5,452,137 | 9/1995 | Lucas | 359/561 |

OTHER PUBLICATIONS

"Fast portable optical correlator for real–world image processing," Optical Processing and Computing, May 1997, SPIE's International Technical Working Group Newsletter, pp9.

"Signal Processing by light," Military & Aerospace Electronics, Nov. 1996, one page.

"Litton's dual–use real–time pattern recognition processor", Profile, Defense & Security Review 1997, (Month Unknown).

*Primary Examiner*—Que T. Le
*Attorney, Agent, or Firm*—Price Gess & Ubell

[57] ABSTRACT

An optical correlator system having a plurality of both active and passive reflective optical components between a source of electromagnetic radiation, such a visible coherent light, and an output detector array in a planar support body along a folded optical axis beam path within the body uses a ferro-electric liquid crystal spatial light modulator as the input sensor and the correlating filter to provide enhanced optical detection of an unknown object at a CCD detector array.

6 Claims, 3 Drawing Sheets

HIGH OUTPUT REFLECTIVE OPTICAL CORRELATOR HAVING A FOLDED OPTICAL AXIS USING FERRO-ELECTRIC LIQUID CRYSTAL SPATIAL LIGHT MODULATORS

BACKGROUND OF THE INVENTION

1. Field of the Invention

The present invention relates generally to improvements in optical correlator systems and more particularly, pertains to a new and improved optical correlator structure to provide enhanced optical detection of an unknown object.

2. Description of Related Art

Many applications including military, medical and security have a requirement for small, lower power, low cost pattern recognition systems that are capable of locating and identifying targets or anomalies. Optical correlators can perform two dimensional pattern recognition at much greater rates than digital systems of comparable size, power and/or weight.

Many modern real time pattern recognition or pattern analysis problems, both military and commercial, can be resolved through the use of correlation. Military missions require a real-time pattern recognition capability for target detection, target recognition, munitions guidance, and many other applications. Commercial applications require a pattern analysis capability for many medical, intelligence, law enforcement, security, robotics and factory inspection applications. Specifically, there is a demand for an optical correlator pattern recognition system that is rugged, low cost, has a lower power configuration, and is very compact, temperature stable and light weight. The processing requirements for robust pattern recognition at real-time rates is very high. Current and near-term digital solutions are still not practical for many applications with respect to the cost, size, weight and power requirements.

The reflective optical correlator with a folded asymmetrical axis of U.S. Pat. No. 5,311,359 assigned to the same assignee as in the present application, discloses an optical correlator pattern recognition system that provides the processing power required at real-time rates in a small, low weight, lower power package.

FIG. 1 is an illustration of the reflective optical correlator of U.S.

Pat. No. 5,311,359. The optical correlator 10 has a planar support body 12 with an irregular perimeter 14 and a plurality of system station 16 formed at selected locations along the irregular perimeter of the support body 12. A plurality of reflective optical components which are both active 16 and passive 18 are positioned at selected system stations 1. An electromagnetic radiation source 20 is positioned at a first system station. Radiation source 20, for example, may generate a coherent light beam which traverses a folded asymmetrical optical axis or path 22 within the planar body 12, as bounded or defined by the reflective optical components 16 and 18. The optical path 22 terminates at a detector 24 positioned at the last system station.

FIG. 2 is an illustration of an optical correlator system within which the optical correlator 10 of FIG. 1 could be utilized. A specific preferred structure for the optical correlator 10 is disclosed in U.S. Pat. No. 5,311,359. The entire disclosure of U.S. Pat. No. 5,311,359 is incorporated herein by reference.

The basic concept of operation of an optical correlator 10 is illustrated by the system diagram of FIG. 2. Input images

46 to be processed by the optical correlator system may be sensed by an input sensor 44 which may be an external digital camera or any other source of image/signal data to be processed. The sensed data is provided to an image preprocessor, data formatter 42 which takes the data from the input sensor 44 and formats it for the input drive electronics 34 of a spatial light modulator (SLM) 28. If the SLM 28 is being illuminated by a coherent beam from electromagnetic energy source 20, which may be a laser diode for example, the data supplied to the SLM 28 by the input electronics 34 patterns the light beam from the laser diode 20 which has been passed through a polarizer 25. The SLM 28 reflects the patterned light beam to a first concave mirror 26 which reflects the received patterned information as a patterned Fourier transform beam through a first polarizer 29 to a second SLM 30. This second SLM 30 also receives filter data from the filter drive electronics 36 that represents anticipated images, as directed by a post-processor 40. This filter data is in the form of a pre-processed Fourier transformation pattern. Receipt by the SLM 30 of the patterned Fournier transform beam at the same time as it patterned with the Fourier transformation pattern of a known filter from the filter data base, causes a combination of the two Fourier patterns by multiplication of the Fourier signals. The resulting combined pattern is reflected by the second SLM 30 to a second concave mirror 27 which focuses a Fourier transform of the combined pattern at SLM 30 through a second polarizer 31 onto a high speed photo detector array such as a CCD array for example. The patterned beam CCD detector array 32 captures the resultant image and the detector electronics 38 and post-processor 40 use the information to generate an output 48 that displays the position of the original input image 46 as determined by the filter image from the data base. The amplitude of the output 48 indicates the extent of the correlation.

For a more detailed example and explanation of an optical correlator system and structure using spatial light modulators and Fourier transform lenses U.S. Pat. No. 5,418,380 should be referred to.

The present invention provides an improved folded segmented optical image processor over these prior art systems.

SUMMARY OF THE INVENTION

A pattern recognition processor using an improved folded and segmented image processor combines active and passive components in a folded optical path within a planar support body to control the pattern of electromagnetic radiation from the input spatial light modulator (SLM), such as a ferro-electric liquid crystal spatial light modulator. The input SLM patterns image information onto the received electromagnetic radiation, or visible coherent light and supplies it to a correlating filter, a second SLM, such as a ferro-electric liquid crystal spatial light modulator, for correlation with a known filter pattern. The correlated input sensor pattern and filter pattern is focused on a detector, a charge couple device, for detection as spatial information, wherein the position of a light point identifies the correlation of the original pattern with respect to a matched filter pattern, and the amplitude of the light identifies the degree of correlation.

BRIEF DESCRIPTION OF THE DRAWINGS

The exact nature of this invention, as well as its objects and the advantages thereof will be readily apparent from consideration of the following detailed description in conjunction with the accompanying drawings, in which like reference numerals designate like parts throughout the figures thereof, and wherein.

DESCRIPTION OF THE PREFERRED EMBODIMENTS

Figure 1:
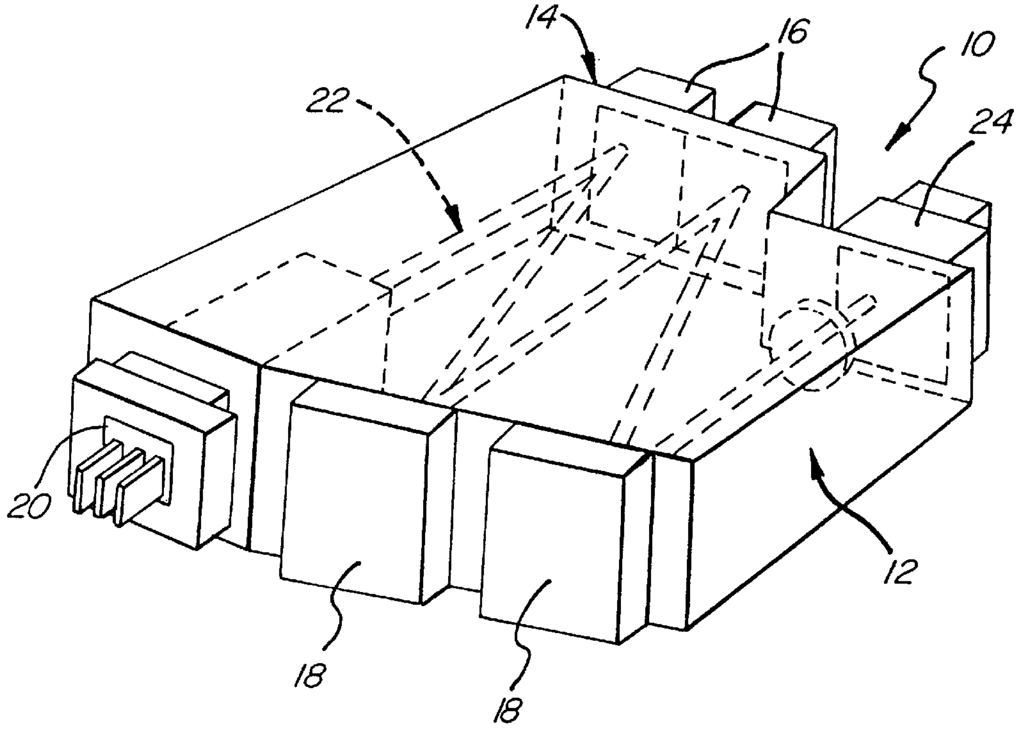
FIG. 1 PRIOR ART
FIG. 1 is a perspective illustration of a prior art asymmetrical reflective optical correlator.
Figure 3:
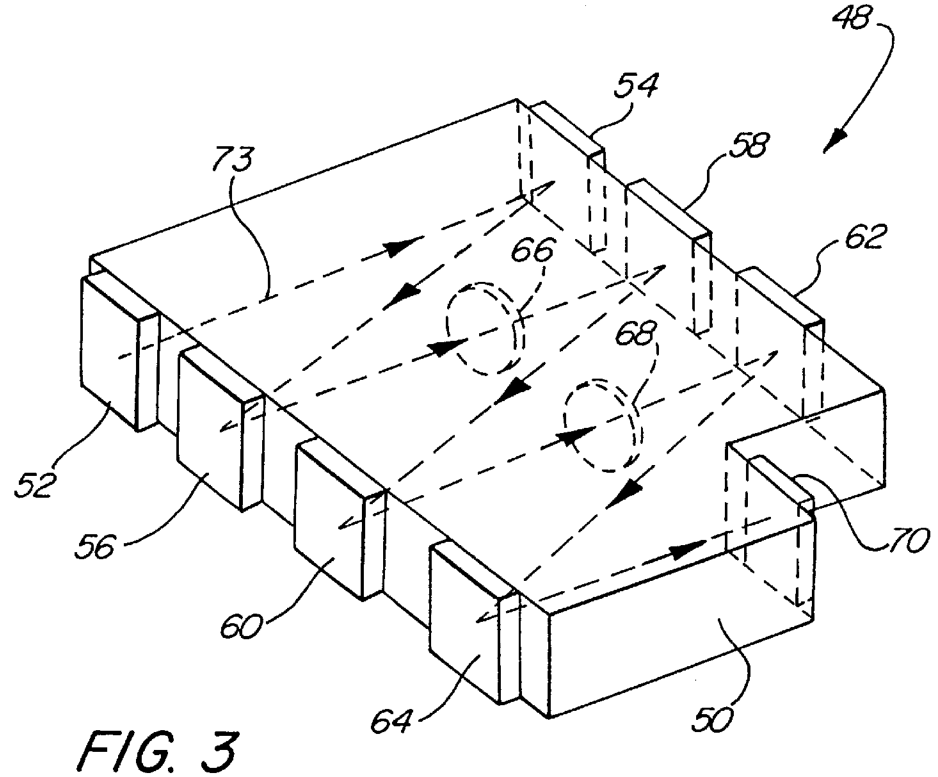
FIG. 3 is a perspective illustration of a folded and segmented optical correlator of the present invention.
Figure 2:
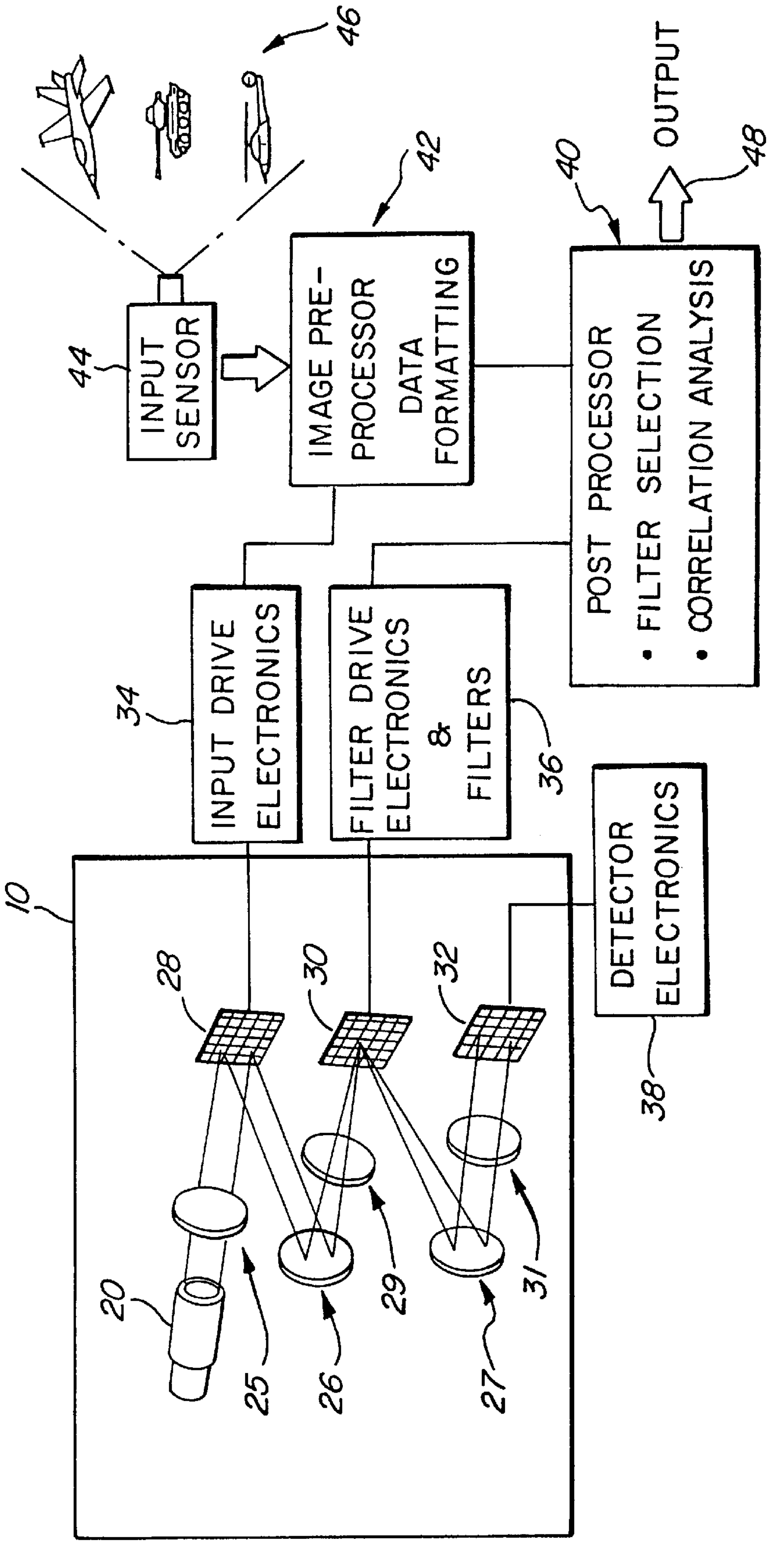
FIG. 2 PRIOR ART
FIG. 2 is an illustration of a reflective optical correlator as used in a block diagram illustration of an image recognition system.

The following description is provided to enable any person skilled in the art to make and use the invention and sets forth the best modes contemplated by the inventors of carrying out their invention. Various modifications, however, will remain readily apparent to those skilled in the art, since the general principles of the present invention have been defined herein specifically to provide the preferred embodiment of an optical correlator of the present invention as shown in FIG. 3. In FIG. 3, the optical correlator 48 includes a planar support body 50, which is preferably formed from a fused quartz ($SiO_2$) or a glass ceramic known as Zerodur, or similar material, in order to maintain all of the passive and active optical components in a fixed and stable configuration with respect to each other in various hostile environments having vibration and temperature variations.

An asymmetrical and folded optical path 73 has several sequential path segments starting with an electromagnetic energy source 52, which is preferably a diode laser, or like device, and ending with a pixel detector, such as CCD planar array 70. The energy beam from the laser 52 is directed to a first spatial light modulator (SLM) 54 which is preferably a ferro electric liquid crystal (FLC) SLM with a 256×256 planar pixel array. SLM 54 receives the input image data, patterns the received energy beam with the image data and reflects it to a first toric mirror 56. Rather than being concave or spherical, a toric mirror has two radii of curvature, the radius of curvature with respect to the meridian plane being different from the radius of curvature along the sagittal plane. This toric mirror produces a first Fourier transformation of the patterned energy beam incident on it and reflects the Fourier transformed energy beam through a polarizer 66 to a second SLM 58 which is also a ferro electric liquid crystal SLM. The second FLC SLM 58 receives the Fourier transform of a known two-dimensional filter pattern in addition to receiving the reflected Fourier patterned energy beam. The combination of the two Fourier patterns, the input image pattern and the filter pattern, results in a multiplication of the matched Fourier signals on a pixel by pixel basis. The second, or filter SLM 58 reflects the combined pattern to a second toric mirror 60 which performs a second Fourier transform on the combined pattern beam and reflects it to a mirror 62. The flat mirror 62 reflects the received energy beam to a third toric mirror 64. The two toric mirrors 60 and 64 together with flat mirror 62 function to converge the patterned energy beam toric onto the pixel array of the CCD detector 70. A polarizer 68 is placed in the energy beam between the toric mirror 60 and the flat mirror 62. The polarizer 68 may be placed anywhere in the beam path after SLM 58. The CCD pixel array is generally smaller than the array of spatial light modulators 54 and 58.

Figure 4:
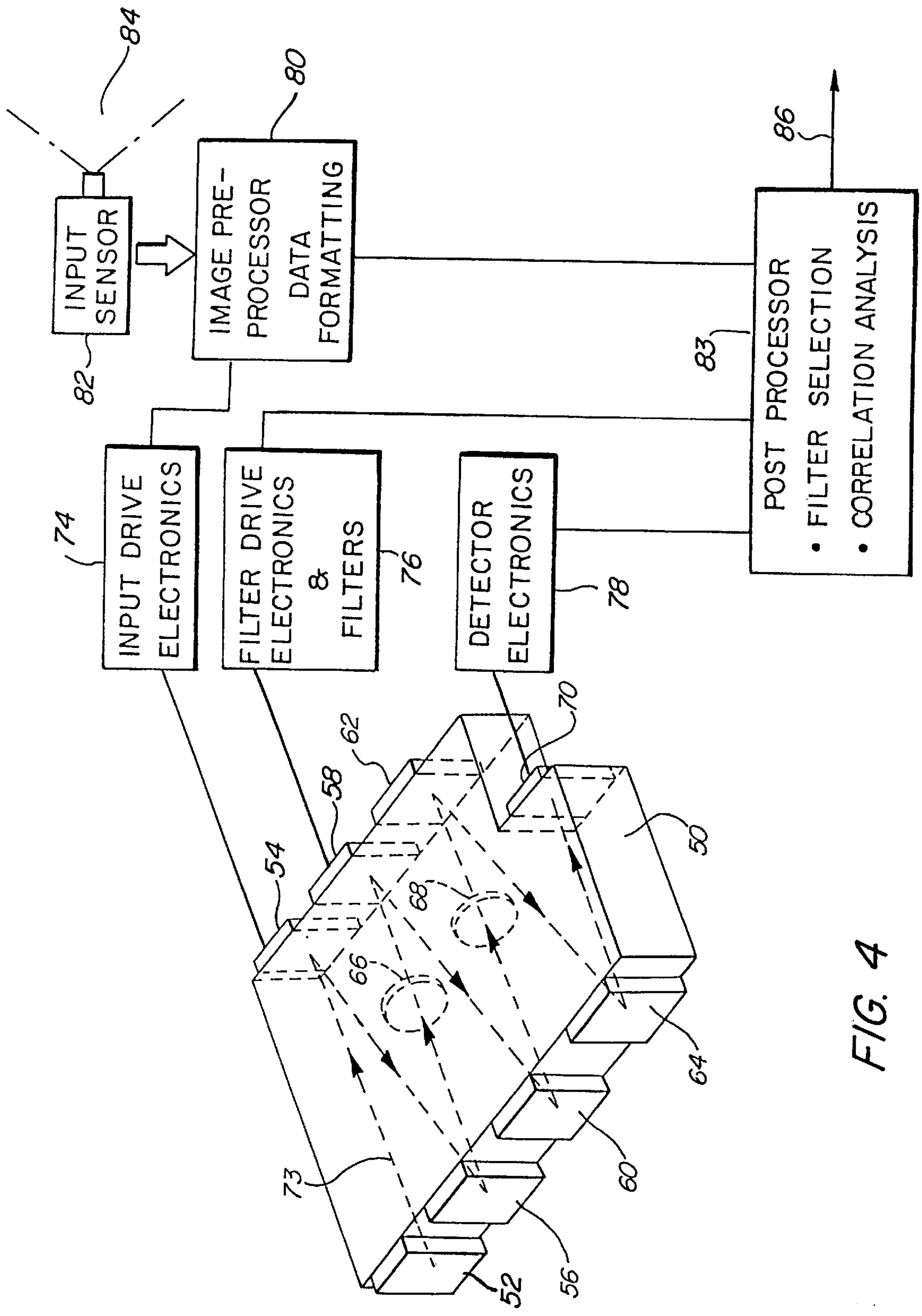
FIG. 4 is an illustration partially in perspective and partially in block diagram form of the optical correlator of FIG. 3 used in an image or pattern recognition system.

The optical correlator 48 of the present invention is shown in FIG. 4 being used as an optical processor in a pattern recognition system, conveniently termed an electro-optical processor. Besides the optical processing occurring in the optical correlator 48, electronic processing is occurring in the electronic portion which provides general purpose pre- and post-processing and interfaces the optical correlator 48 with external systems. The electronic portion of the electro-optical processor shown in FIG. 4 utilizes an input sensor 82 that detects an input pattern 84 and provides information about the input pattern to an image pre-processor 80. The image pre-processor 80 utilizes algorithms and data formatting on the image information before it is supplied to input drive electronics 74 as the input for FLC spatial light modulator 54 which is a 256 ×256 pixel array. Post processor circuitry 83, in addition to, containing filter selection and correlation analysis capabilities has sufficient memory for storing at least 4,000 binary phase only filters (BPOFs), with each filter being a 256×256 pixel array. These binary filters are supplied to filter drive electronics 76 and then to the second or filter FLC spatial light modulator 58.

The detector electronics 78 receiving the detected signals from CCD array 70 utilizes control circuitry that supports low noise read-out and digitized detection of the correlation plane at the CCD array 70.

The resulting system permits use of simpler drive electronics with the FLC spatial light modulators as input and filter SLMs. In addition, the substantially increased light efficiency of the FLC spatial light modulators improve the correlation signal to noise ratio considerably, allowing the entire system to operate at a frame rate of 1925 frames per second. All of these improvements are in addition to a significant increase in detection performance.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. An improved optical correlator for detecting and identifying an unknown object, comprising:

a first spatial light modulator (SLM) for receiving image data of the unknown object and patterning an electromagnetic beam according to the image data of the unknown object;

a first toric mirror for producing a first Fourier transformation of the electromagnetic beam from the first SLM;

a second SLM for receiving a Fourier transformed pattern of a known object and patterning the electromagnetic beam from the first toric mirror according to the Fourier transformed pattern of the known object;

a second toric mirror for producing a second Fourier transformation of the electromagnetic beam from the second SLM;

a charge coupled device (CCD); and a reflective surface for converging the electromagnetic beam from the second toric mirror onto the CCD.

2. The correlator of claim 1 wherein the CCD has a lower pixel count than each of the first and second SLM.

3. The correlator of claim 2 further comprising a third toric mirror positioned in the electromagnetic beam path between the reflective surface and the CCD for converging the electromagnetic beam onto the CCD.

4. The correlator of claim 3 wherein the second and third toric mirror and the reflective surface provide a 4:1 convergence.

5. The correlator of claim 1 wherein each of the first and second SLM is a ferro-electric liquid crystal (FLC) SLM.

6. The correlator of claim 1 wherein the reflective surface is a flat mirror.

* * * * *